June 28, 1966  A. E. SEED  3,258,729
LOAD CELL
Filed Oct. 18, 1963
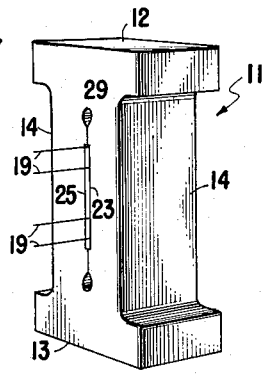
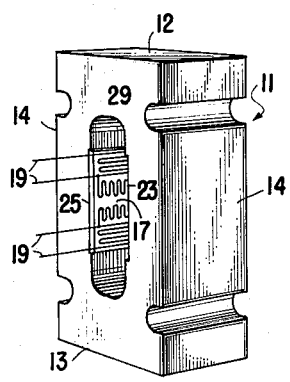
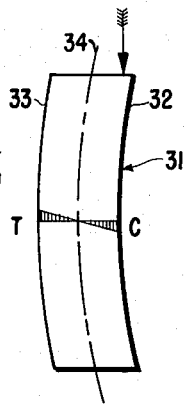
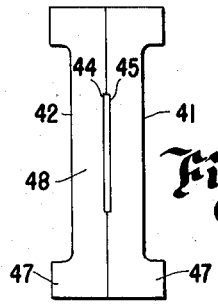
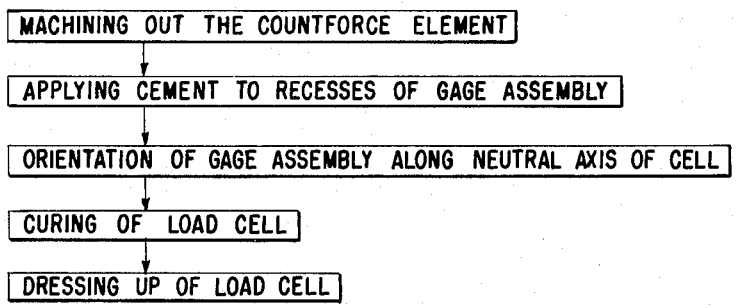
INVENTOR.
ANIESE E. SEED
BY Marshall, Wilson & Yeasting
—attorneys—

United States Patent Office 3,258,729
Patented June 28, 1966

3,258,729
LOAD CELL
Aniese E. Seed, Toledo, Ohio, assignor to Toledo Scale Corporation, Toledo, Ohio, a corporation of Ohio
Filed Oct. 18, 1963, Ser. No. 317,301
4 Claims. (Cl. 338—2)

This invention relates to measuring devices, and in particular to load cell type measuring devices and to a method of manufacturing the same.

The prior art teaches the use of strain gage transducers with spring counterforce elements for determining the magnitude of loading applied to the counterforce element. The usual load cell embodiment has taken the form wherein the gages are mounted along strategically located inner or outer peripheries or surfaces of the counterforce elements. The counterforce elements have been of every conceivable type and shape ranging from basic and simple columnar designs to elaborate annular types. Further, the prior art strain gages have usually taken the form of a filament whose electrical resistance varies with change of strain. The strain gages have been bonded throughout their effective length to a member, a counterforce element, which is subject to strain variations in response to the application of a load or force thereto. The filament or strain gage is then connected to a suitable electrical circuit, a Wheatstone bridge, for measuring the change of filament resistance in response to the variations of strain.

The load measuring ability of prior art load cells wherein the strain gages are mounted upon surfaces of the counterforce elements have been particularly prone to, and affected by, the load not being centrally applied to the load cell.

An additional problem which has often been encountered in prior art load cells is the occurrence of a change in load output indication with the passage of time for a given applied load. This phenomenon has been called gage creep, and has been attributed to various factors, prominent among these being that heretofore only one surface of the gage has been connected to the spring element with the result that the other surface thereof has been relatively free of restraining or activating forces.

In accordance with the above it is an object of this invention to provide a load cell whose associated strain gages will be substantially free of bending forces applied to the load cell.

It is another object of this invention to provide a load cell whose strain gages will be substantially free of ambient temperature fluctuations.

It is still another object of this invention to provide a load cell which is capable of rapidly dissipating the heat generated by the application of a bridge voltage to the strain gages associated therewith.

It is still another object of this invention to provide a load cell whose load responsive transducers yield a substantially unvarying output signal in response to a load applied to the load cell.

It is a further object of this invention to provide a load cell whose associated strain gage is totally enclosed therein and accordingly less prone to damage.

It is still a further object of this invention to provide a load cell which is easy to make, of rugged construction, free from any torque loading effects, and reliable.

In accordance with the above and first briefly described there is provided a load responsive device comprising, a resilient counterforce element having a neutral axis, said resilient counterforce element being provided with upper and base load receiving surfaces, and strain gage transducing means, said transducing means being embodied within the counterforce element along the neutral axis thereof and accordingly having its surfaces contiguous to the surfaces of said load cell into which it is embedded, said device thereby being substantially free from bending loads applied thereto.

Further objects and features of the invention will become evident as details of construction and operation of the invention are explained in the ensuing specification with reference to the accompanying drawings, in which:

FIGURE 1 is an illustration of a completed load cell with output leads being available therefrom for connection to a Wheatstone bridge voltage source and output measuring means;

FIGURE 2 is an exaggerated view showing a machined counterforce element with its associated strain gage assembly mounted to an inner surface thereof prior to the finally finished products;

FIGURE 3 is an exaggerated view showing the imperviousness of the strain gage assembly mounted along the neutral axis of a counterforce element to eccentrically applied loading forces;

FIGURE 4 is an alternate construction of the finished product; and

FIGURE 5 is a flow diagram depicting the steps necessary for producing a load cell having a totally embedded strain gage assembly.

Referring to the drawings, there is shown in FIGURE 1 a load cell made up of an I-shaped counterforce element having, respectively, rectangular upper and lower load receiving elements 12 and 13, and a load supporting strut 14. It should be appreciated that the shape of the counterforce element is of no significance and I am illustrating the embodiment shown only for purposes of explanation, and any type of structure which is symmetrical about a neutral axis can be used.

Gage assembly 17 may include a single strain gage, or it may include all of the gages making up the bridge arms of a conventional Wheatstone bridge circuit. I have shown the assembly to include all four of the Wheatstone bridge gage arms. It should, of course, be appreciated that some of the gages may only be included to function as passive strain gages for temperature compensation. The terminals of the individual gages will be connected in series circuit arrangement to form the well known bridge configuration. The gages are of standard commercially available filament design comprising the well known single strand, reversely bent upon itself in hairpin fashion, type. But it should be understood that any type of gage such as wire, semiconductor, etc., may be employed. Moreover, in this case in order to reduce the effects of off center loading which results from a load being applied non-centrally along a plane in which the strain gage assembly lies, the gages are each chosen to be of long and narrow design.

Prewelded to the junction points of the bridge arms are foil or ribbon type leads 19. These leads are made of small transverse dimension so that they may be compressed within the longitudinal opening 29, of load deflecting strut 14, without any damage resulting thereto. In conventional Wheatstone bridge style, the activating voltage source will be connected to two of the leads 19, whereas a measuring device will be connected to the remaining two leads.

Load deflecting strut 14 may be machined with shallow, strain gage assembly accommodating channels or recesses on opposite sides of the centrally locating opening 29. By providing opposed recesses, each being substantially equal to one half of the gage assembly width, assembly 17 can be totally embedded within the deflecting element and yet not be damaged in any way.

FIGURE 3 illustrates in exaggerated diagrammatically fashion the effects of an eccentrically applied load upon a columnar-shaped counterforce element. As shown, the application of a non-centrally located load results in a bending of the counterforce element 31, with the side 32 thereof assuming a convex deformation and the side 33 being concavely deformed. Accordingly, as is the case in prior art load cells, a strain gage mounted upon either of these surfaces will be influenced by and reflect the different forces experienced along the surfaces due to the eccentrically applied loads. Since the strain gage will accordingly not only be reflecting a strain due to the applied load, but will also be reflecting a bending strain due to the eccentrically applied load, it is obvious that the load measured thereby will be in error. Various schemes have been used in the prior art to compensate for the differentially experienced strains of the individual strain gage. For example, the error in load measurement which would be sensed by an individual strain gage is compensated for by employing a second gage which is mounted on the counterforce element upon a surface thereof which is geometrically opposite to that upon which the first is mounted. The two gages are then connected in circuit with each other to effectively cancel out the effects of eccentric loading experienced in each.

As shown in FIGURE 3 any counterforce element which is strained by bending, for example side loading, will have a neutral axis with equal but opposite forces acting on either side thereof. Furthermore, as illustrated by the loading diagram in FIGURE 3 the compressive stress experienced by eccentrically loaded counterforce element 11 is equal and opposite to the tensile stress, and the unit stress varies as the distance from the neutral axis. Therefore by mounting all of the active Wheatstone bridge elements along the neutral axis of the counterforce element they will be unaffected by bending and the output load indicated thereby will be uninfluenced by eccentrically applied loads. Accordingly, the advantages obtained by mounting the strain gage assembly along the neutral axis of a counterforce element becomes immediately obvious, and included among these is the substantial reduction of the influence thereupon of side loading to the load cell. Furthermore, the various schemes which were necessary in the prior art load cells in order to compensate for side loading are not necessary, and I can obtain a substantially moment-free reading by mounting the strain gage measuring means along the neutral axis of the counterforce element.

Furthermore, by embedding my strain gages within the counterforce element of the load cell the heat problems experienced by the application of the bridge potential to the strain gage of a low capacity spring element is reduced. The problems experienced by prior art low capacity load cells wherein the load responsive counterforce element is necessarily of small area was that the application of a bridge potential to the strain gage resulted in a great amount of heat being generated at the point of attachment of the gages to the counterforce element. This heating resulted in a substantial temperature rise in the strain gages and accordingly affected the resistance thereof. Obviously, the change in resistance value due to temperature will result in an error in the output loading determination which is a reflection of the change in resistance value due to the strain experienced in the counterforce element upon the application of a load thereto. By embedding the assembly 17 into the load deflection member 14 I have found that the heat generated upon the application of the bridge potential thereto, by way of leads 19, will be quickly dissipated by the contiguous surrounding surfaces of the counterforce element. In other words, the load responsive element 14 of counterforce element 11 acts as a heat sink for the heat generated by the passage of the bridge potential through the resistive strain gages, and accordingly results in a very small temperature rise therein. This, of course, results in a substantial elimination of the load measuring error resulting from a change in resistance value of the strain gage due to temperature.

Another condition to which prior art load cells are subject is gage creep. Gage creep as explained above, is the phenomenon whereby a given load indicates, after the application of a load to the load cell, a slow change in the measured value thereof. In other words, the output load indication of a load cell will slowly vary with the passage of time after the application of a load to a load cell with no other disturbances being made. This obviously is a limitation which should be eliminated if at all possible. The exact cause of gage creep is not known. However, it is clear that by embedding and bonding strain gage assembly 17 inside of load deflecting element 14 of load cell 11 that my gages will be less susceptible to gage creep than are the prior art devices. I attribute this decrease in gage creep to the fact that the prior art schemes have had only a single side of the strain gages bonded to a surface of the counterforce element. This of course means that the unbonded surface of the strain gage was not directly under the same stress forces as the bonded surface. As shown in FIG. 1 my strain gages are bonded on both surfaces to opposite sides of the longitudinal opening 29 of load deflecting strut 14. This results in both surfaces of the strain gages being under similar stresses at the same time. By embedding and cementing the strain gages within the counterforce element, it has been found that the gage creep problem has been substantially eliminated.

As an added precaution against the longitudinal slot 29 being opened upon the application of a compressive load to load cell 11 the opposite sides thereof may be welded together to form a continuous homogeneous junction coextensive therewith.

While I have shown and described a unitary type load cell 11 wherein a strain gage assembly 17 is embedded within a longitudinal slot along the neutral axis thereof, it should of course be appreciated that I could just as easily have started with two substantially upright U-shaped sections each having two flanges 47 extending integral from supporting base sections 48, see FIG. 4. The relative size of the flanges and the interconnecting base or web are a matter of individual design. The outer surface of the base can be provided with opposed strain gage assembly housing channels or recesses 44 and 45. The depth of the channels each being equal to substantially one-half of the transverse dimension of the strain gage assembly so as to provide a contiguous relationship therebetween upon the joining together of the two web sections 48 without any damage to the assembly due to compression. The two sections 41 and 42 can then be welded along the outer opposed surfaces to form a substantially homogeneous junction therebetween.

I shall now describe the steps that I outlined in FIG. 5 which are necessary in carrying out the process for the production of a unitary load cell as shown in FIG. 1. Although the invention may be applied to any type of counterforce element, to eliminate the procedure of determining the neutral axis of the counterforce element I start with an element which is machined with a central aperture or slot 29, see FIG. 2. Shallow strain gage assembly accommodating recesses 44 and 45 will also be formed into the inner opposed surfaces of slot 29. Further, as shown in FIG. 2, four necked down notches will be machined into counterforce element 11. These notches provide element 11 with a definite amount of lateral movement so that the slot 29 may be eliminated by equal transverse movements of the sides forming the load deflecting element 14, towards each other.

The next step in carrying out my method is the bonding of strain gage assembly 17 to either channel 23 or 25. This is done by first applying an epoxy cement, or any adhesive cement such as Duco or Glyptal to the surfaces forming the channels. Additional cement may also be applied to the surfaces of the strain gage assembly 17 itself. The assembly 17 is then placed into one of the channels.

The opening of slot 29 is then closed by pressing the counterforce element together. In practice it is found that the strain gage will lie along the neutral axis of the load cell if both sides forming the load deflecting element 14 are pressed toward each other an equal distance until the opening 29 is closed. Accordingly, by starting out with aperture or slot 29 symmetrically located within load deflecting element 14, and then closing the slot or opening by equal inwardly movements of the surrounding wall portions of element 14 strain gage assembly 17 will be located along a symmetrically positioned plane which contains the neutral axis of the load cell.

After the aperture of the load cell has been closed, to thus place the strain gage along the neutral axis thereof, it is then subjected to a curing step. The curing step involves subjecting the load cell to heat for an extended period of time. The length of time and temperaturre of the oven into which the load cell is placed will vary with the materials used. For example, where the bonding agent used was epoxy cement it has been found necessary to subject the load cell to a temperature of 200° F. for two hours and then to post-cure the load cell at a temperature of 225° F. for four hours. However, all that need be said is that the step be carried out for as long as it is necessary to firmly bond the strain gage to the load cell surface. The strain gage surfaces should be so firmly bonded to the contiguous surfaces of the load deflecting member 14 so that each infinitesimal portion of filament 17 is strained identically with the load cell surface without any detectable creepage even though subjected to repeated applications of stress in either a compressive or tensile direction. Accordingly, assembly 17 is contiguously held to the surfaces of now closed slot 29 by the bonding and baking process outlined above.

The final step may involve the welding of the slot defining walls of load deflecting member 14 together to form a uniform junction which is not subject to opening under the influence of compressive loads being applied to the load receiving surface 12.

Of course, if the load cell is made up of two side oriented U portions welded along the outer web surfaces, and finally resulting in a common or integral load deflecting element having upper and base end elements, as shown in FIG. 4, a slightly different procedure is required. To form a load cell as shown in FIG. 4 it is initially required to form opposed shallow strain gage receiving recesses 44 and 45 on the outer surfaces of the web or base elements 48. The next step is to apply the bonding cement to each of the recesses and the outer surfaces of the strain gage assembly 17. The assembly is then positioned in one of the recesses and the other recess is closed thereabout. The structure is then placed in an oven and baked in accordance with the requirements as outlined above. Finally the two U sections will be welded together along the opposed contiguous surfaces of webs 48 to form a substantially integral load cell as shown in FIG. 4.

While I have shown and described my invention in considerable detail it is to be understood that various changes in details of construction and arrangement of parts may be made by those skilled in the art without departing from the spirit and scope of my invention as shown and described.

Having described the invention, I claim:

1. A load cell comprising, in combination, a counterforce element having a neutral axis and electrical strain gage means embedded within the counterforce element and including strain sensitive resistor means on the neutral axis, the strain gage means being surrounded substantially completely by the counterforce element and bonded fully thereto.

2. A load cell according to claim 1 wherein the strain sensitive resistor means includes a plurality of strain sensitive resistors arranged in a bridge circuit embedded within the counterforce element and lying on the neutral axis.

3. A load cell comprising, in combination, a counterforce element having a neutral axis and electrical strain gage means embedded within the counterforce element and arranged substantially in a single plane on the neutral axis, the strain gage means being surrounded substantially completely by the counterforce element and bonded fully thereto.

4. A load cell according to claim 3 wherein the strain gage means includes a plurality of strain transducing means arranged in a bridge circuit embedded within the counterforce element and lying on the neutral axis.

References Cited by the Examiner

UNITED STATES PATENTS

| | | | |
|---|---|---|---|
| 2,600,029 | 6/1952 | Stone | 338—2 X |
| 2,629,801 | 2/1953 | Warshaw | 338—4 |
| 2,873,341 | 2/1959 | Kutsay | 73—88.5 X |
| 2,984,102 | 5/1961 | Soderholm | 338—5 X |
| 2,986,805 | 6/1961 | Jonke | 29—155.62 |
| 3,083,445 | 4/1963 | Hill | 29—155.62 |
| 3,092,798 | 6/1963 | Beckman | 338—2 |
| 3,124,769 | 3/1964 | Peterson | 338—2 |
| 3,130,383 | 4/1964 | Hottinger | 338—5 |

RICHARD M. WOOD, *Primary Examiner.*

H. T. POWELL, W. D. BROOKS, *Assistant Examiners.*